United States Patent [19]

Hamstra et al.

[11] Patent Number: 6,083,541
[45] Date of Patent: *Jul. 4, 2000

[54] METHOD FOR THE PREPARATION OF FEED PELLETS

[75] Inventors: Reinder Sietze Hamstra, Pe Den Haag; Augustinus Franciscus Tromp, HX Oegstgeest, both of Netherlands

[73] Assignee: DSM N.V., Netherlands

[*] Notice: This patent is subject to a terminal disclaimer.

[21] Appl. No.: 09/021,417

[22] Filed: Feb. 9, 1998

Related U.S. Application Data

[63] Continuation of application No. 08/122,513, filed as application No. PCT/NL93/00025, Jan. 25, 1993, Pat. No. 5,716,655.

[30] Foreign Application Priority Data

Jan. 24, 1992 [EP] European Pat. Off. .............. 92200210

[51] Int. Cl.⁷ ...................................................... A23K 1/16
[52] U.S. Cl. ................. 426/63; 426/2; 426/281; 426/302; 426/454; 426/516
[58] Field of Search ................................. 426/2, 63, 281, 426/302, 516, 454

[56] References Cited

U.S. PATENT DOCUMENTS 5,716,655  2/1998  Hamstra et al. ........................... 426/63

FOREIGN PATENT DOCUMENTS 231817   8/1987  European Pat. Off. .
2933261  2/1981  Germany .

*Primary Examiner*—Leslie Wong
*Attorney, Agent, or Firm*—Morrison & Foerster LLP

[57] ABSTRACT

The present invention discloses a method for obtaining feed pellets. The method includes the addition of active ingredients to feed pellets after the pellets have been extruded. The method further includes the addition of a solution or suspension of the desired feed or ingredient in a water or oil phase to the pellets under reduced pressure and subsequently increasing the pressure. The method results in pellets with a high degree of loading and in which the active ingredients are homogeneously distributed.

12 Claims, 3 Drawing Sheets

(3 of 3 Drawing Sheet(s) Filed in Color)

though the use of simpler processes. The present invention shows that this can be done by addition of the material after the extrusion process.

METHOD FOR THE PREPARATION OF FEED PELLETS

This application is a continuation of U.S. Pat. No. 5,716,655 issued Feb. 10, 1998. The disclosure of this patent is incorporated herein by reference.

FIELD OF THE INVENTION

The present invention relates to a method for preparing feed pellets. The process for the addition of sensitive ingredients during the preparation of pellets is so altered that activity losses are minimized. Specifically, the pellets are treated by mixing a suspension or solution of active ingredients in a fluid phase (for example oil or water) under appropriate conditions with carrier material which has been previously granulated.

BACKGROUND OF THE INVENTION

Feed is generally prepared by mixing different ingredients which are found to be necessary (active ingredients) with carrier materials essential to obtain the feed in the desired form. The desired form may be a powder, a pellet, a solution or a suspension. The preferred form will depend on the application conditions, the composition and the transport.

A well known problem in feed preparation is the loss of active substance during the pelleting process, especially when extrusion is used. Extensive research results have been published describing the loss of activity of the active ingredients during extrusion cooking.

Lee et al. (AIChE Symposium Series (1978) 172:192–195) investigated the stability of vitamin A in extrusion cooking processing. The percent of retention of the different tested forms of vitamin A ranged from 50 to 100%. This was reported to be relatively stable when compared with the retention of cantaxanth,n which was reported to be in the range of 30 to 35%. Berset (Ind. Aliment. Agric. (1987) 104:529–533) reports a loss of 18% of cantaxanthin when a commercial preparation was treated. Hencken and Estermann (Aquaculture Ind. Develop. Report (1991) 91:34–51) report a 25 to 48% loss of activity of synthetic astaxanthin during fish feed preparation using extrusion cooking.

A possible solution to this loss of active substance during granulation is to add the active ingredient in a suitable form like a suspension or solution in a fluid phase subsequent to the granulation step. Mixing of components with a fluid phase can be difficult since active ingredients are not always soluble. Furthermore, the addition after the extrusion step makes it more difficult to obtain a homogenous product.

High concentrations of active ingredients in feed for cattle, poultry or fish in a form which is easy to handle and easy to quantify can be obtained by soaking granulated particles with a suspension or solution containing the desired feed or ingredients thereof. The granulated material contains pores which are filled with the solution or suspension and the loaded pellets can easily be used.

The loading of the pellets is generally performed at atmospheric pressure. The process poses some severe drawbacks:

it is difficult to reproduce the amount of suspension or solution which is absorbed into the pellets, this is especially relevant if the aim is to control the amount of fluid (oil etc.) which is fed to the animal concerned, the pellets are generally preferentially covered at their surface, which may cause problems (like oxidation) of the active ingredient, the particles in the suspension may block the pores leading to an inefficient use of the particle pore volume and to the above mentioned surface phenomena.

There is thus a lack of reproducibility in dosage of the active substance and a higher chance to losses of active ingredient as a consequence of insufficient penetration of the active ingredient in the feed granule.

To avoid these problems granulated material with wide pores can be used but this evidently leads to loss of strength of the loaded pellets.

The present invention overcomes the problems described above.

SUMMARY OF THE INVENTION

The present invention discloses a method for minimizing the loss of activity of sensitive materials due to the well known extrusion process. The invention discloses that this can be done by addition of the material after the extrusion process. The invention is exemplified by the addition of astaxanthin in oil to feed pellets. The invention thus discloses a method for preparing feed pellets loaded with an active ingredient comprising the addition of active material after the extrusion process. The active ingredient is an enzyme, a vitamin, a pigment or a carotenoid. Preferably, the active ingredient is astaxanthin.

The present invention further provides a method for preparing pellets which are homogenously loaded with active ingredient. The method comprises the addition of a suspension or solution of the active ingredients to pellets under reduced pressure and subsequently increasing the pressure. Preferably, the addition is performed under vacuum.

The present invention also provides feed pellets which have been obtained by this method. Specifically, fish meal pellets soaked with an oil suspension containing astaxanthin are disclosed. Such pellets can be recognized by their high degree of loading which is moreover relatively homogenous. A fish pellet is disclosed which contains more than 81.5 mg astaxanthin per kg dry matter.

DETAILED DESCRIPTION OF THE FIGURES

The file of this patent contains at least one drawing executed in color.

DETAILED DESCRIPTION OF THE INVENTION

Figure 1A:
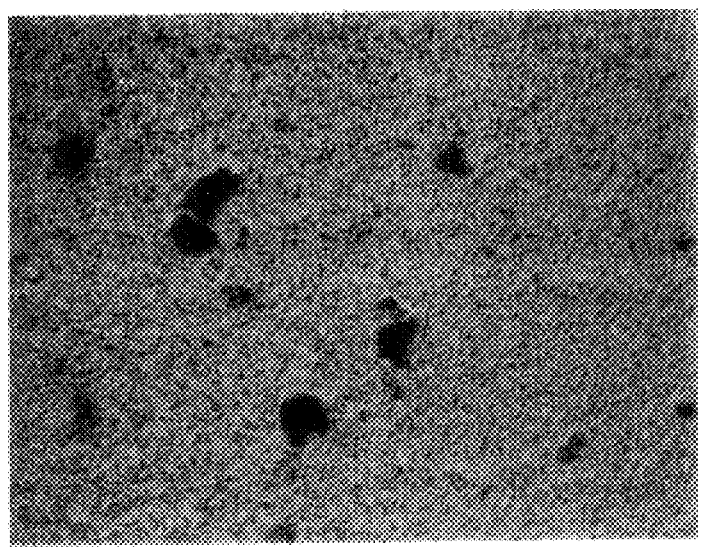
FIG. 1 shows the spray dried *Phaffia rhodozyma* suspended in oil after one (A), two (B) and three (C) passes through a bead mill.
Figure 1B:
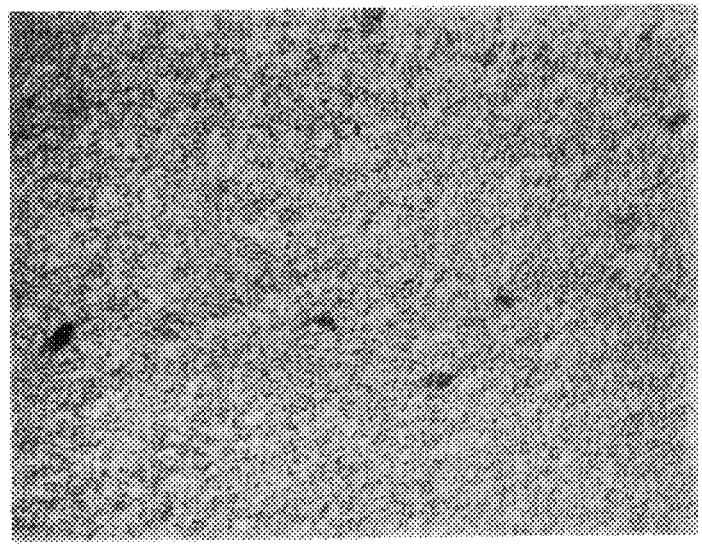

The present invention discloses a method for preparing feed pellets. The present invention discloses how the loss of activity of sensitive materials due to the well known extrusion process can be minimized. The invention discloses a a method for preparing feed pellets loaded with an active ingredient comprising the addition of active material after the extrusion process. The extrusion process can also be the so-called extrusion cooking process. The active ingredient is an enzyme or protein, a pigment or a carotenoid.

The addition of the active ingredient (or any ingredient which can be damaged by the extrusion process) after the extrusion process may cause a problem due to the fact that the extrusion process also serves to obtain a homogenous feed pellet. This problem can be circumvented by the addition of a suspension or solution of feed or ingredients thereof in a fluid phase to the pellets under reduced pressure and subsequently increasing the pressure. The reduced pressure can be vacuum.

The fluid phase can be any fluid (for example water or oil) provided that the active ingredient can be dispersed or dissolved in this fluid. In the present examples capelin-oil is used.

The present invention discloses a method for preparing pellets loaded in a controlled manner with active ingredients. The method comprises the addition under mixing of a suspension or solution of feed or ingredients thereof in a fluid phase to the pellets under vacuum and subsequently releasing the vacuum.

The pellets are composed of an edible material. The specific composition depends on the desired characteristics of the material. The choice of the pellet, volume, weight and pore diameter also depends on the kind of feed one wants to use and on the application for which the loaded pellets are meant. A preferred pellet material in the present invention is fish meal.

The feed or feed ingredient may be any ingredient that is needed. The choice may depend on the nutritional value or on certain Theological characteristics which may be obtained by the activity of the ingredient. In the following some examples of feed or feed ingredients will be discussed. In general terms enzymes or proteins, pigments, vitamins, antioxidants, colouring agents and carotenoids can be employed. Obviously combinations of these ingredients can be added, simultaneously or successively.

a) Enzymes

In general all feed enzymes can be used in the present method these include phytase, amylase and protease. Amylase may be brought on the pellet and subsequently the pellets can be mixed with feed. It is also possible to add the enzyme suspension after pelletizing/extrusion. The activity of this enzyme can be quantified and the added amount controlled. The enzyme can change the fluidity of the feed to which it is added or improve the digestability of feed components.

Another example of an enzyme is phytase here again the dosage can be controlled by the method of the present invention.

b) Carotenoids

Astaxanthin is used as a natural colourant for salmonids. Astaxanthin cannot be solubilized in a water phase. A suspension of astaxanthin in oil or a suspension of *Phaffia rhodozyma* cells (or cell fragments) containing astaxanthin in oil, can be used to soak the pellets. Incidentally, it was found that this astaxanthin contrary to the commercial synthetic astaxanthin as used by Hencken and Estermann (1991, opt. cit.) could form a stable suspension in oil.

The amount of oil and astaxanthin fed to the fish can thus be controlled. The control of the amount of oil provides a way of influencing the growth rate of the fish. Other carotenoids which can advantageously be used in the method of the present invention include B-carotene, cantaxanthin and zeaxanthin.

Desired pellets are brought under vacuum and the liquid phase which may be a solution or suspension of desired feed or ingredients thereof or other ingredients in a water or oily phase is added. The equipment used can range from a waterjet and a flask which can be vacuated at laboratorium scale via a Rotorvapor to large scale equipment.

The pellets obtained by the present method show a high degree of loading, moreover the pellets are loaded relatively homogenously. Furthermore, the amount of loading can be regulated by regulating the amount of fluid phase added. This is especially important if one wants to regulate the amount of oil provided to the desired animal eg. fish.

The present invention discloses for example fish meal pellets which contain more than 30 mg preferably more than 81.5 mg astaxanthin per kg of dry matter.

The present invention thus provides a method for preparing feed pellets wherein the active ingredient is added after the extrusion. The feed pellets are subsequently loaded under reduced pressure which makes possible an acurate, reproducible and homogenous loading.

EXAMPLE I

Preparation of an oil suspension containing astaxanthin

A *Phaffia rhodozyma* culture was centrifuged and dried by spraydrying. The spraydried powder ($d_p$=100 $\mu$m) was suspended in a commercial fish-oil (Capelin oil). The mixture of cell material containing astaxanihin and oil was ground in a bead mill. After one pass of milling the particle diameter was determined. Microscopic analysis indicated that a large proportion of the spraydried powder particles were disintegrated. A small portion of the particles (<5%) was unaffected and had a diameter of about 100 $\mu$m (FIG. 1A). The astaxanthin concentration was about 630 ppm (Suspension I).

Figure 1C:
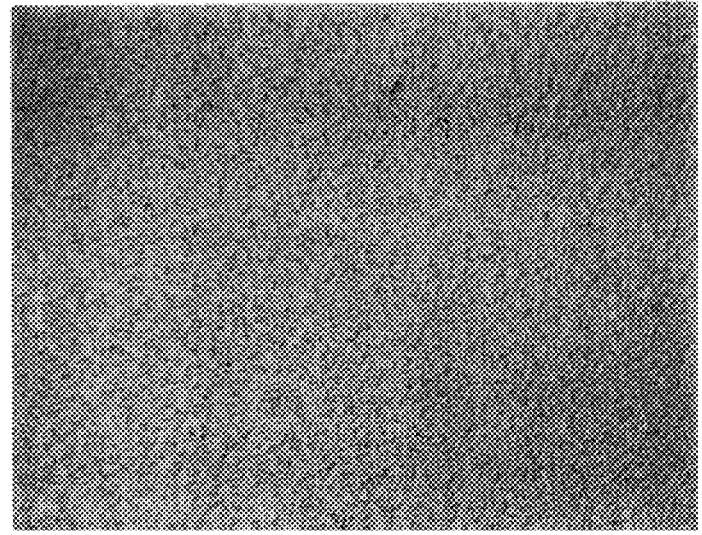

A second suspension was prepared (Suspension II) by grinding the particles three times in a bead mill (FIG. 1C). Microscopic analysis revealed that practically all cells were disintegrated, the largest agglomerates of cells had a diameter of less than 20 $\mu$m.

The astaxanthin concentration was 330 ppm.

EXAMPLE II

Soaking of fish meal pellets

Commercial fish meal pellets were obtained from Trouw International (Putten, the Netherlands). These pellets were semi-manufactured, which means that they had not been treated with oil. These pellets have a diameter of 8 mm, a length of between 0.8 and 1.2 mm and a weight of between 220 and 330 mg.

Further experiments have all been performed in duplo, data reported are the mean values.

A. Soaking at atmospheric pressure 100 g of fish meal pellets were brought into a 1 L beaker. 25 g of an oil suspension containing about 8 mg astaxanthin, was added (Suspension II or twice diluted Suspension I). Mixing was performed during 1 hour in a Turbula mixer.

B. Soaking under vacuum 100 g fish meal pellets were dried under vacuum for 30 min. at 60° C. in a 500 ml flask in a Rotorvapor. Vacuum was obtained using a waterjet. 25 g of an oil suspension containing astaxanthin was added (as above) in small amounts with vacuum application in between. Rotation was continued for 10 min. and the flask was subsequently cooled on an ice bath.

EXAMPLE III

Analysis of soaked pellets

A. Microscopic analysis

Figure 2A:
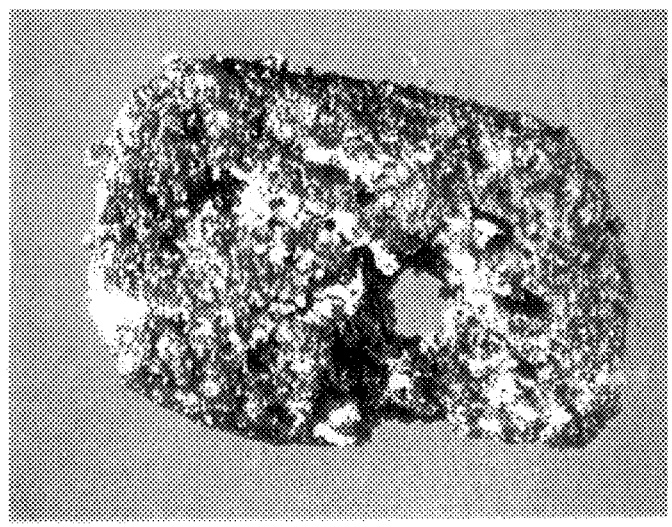
FIG. 2 shows the results of the addition of the suspensions of FIG. 1(A), (B) and (C) under atmospheric pressure to the fish meal pellets.
Figure 2B:
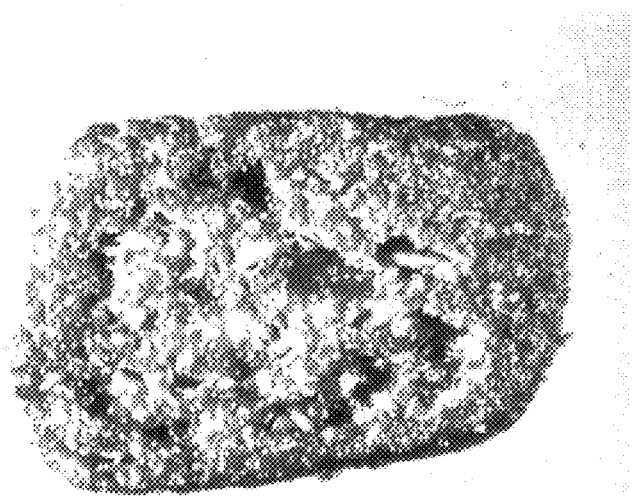
Figure 2C:
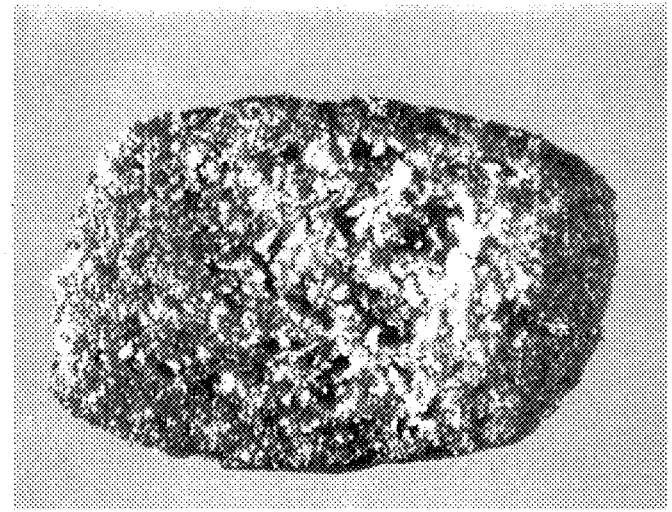

When pellets were prepared at atmospheric pressure the pellets obtained using Suspension I mainly gave a red colour (astaxanthin) at the surface (FIG. 2A). Pellets obtained using Suspension II showed a red colour also in the interior but the concentration at the surface was higher (FIG. 2B and C).

Figure 3A:
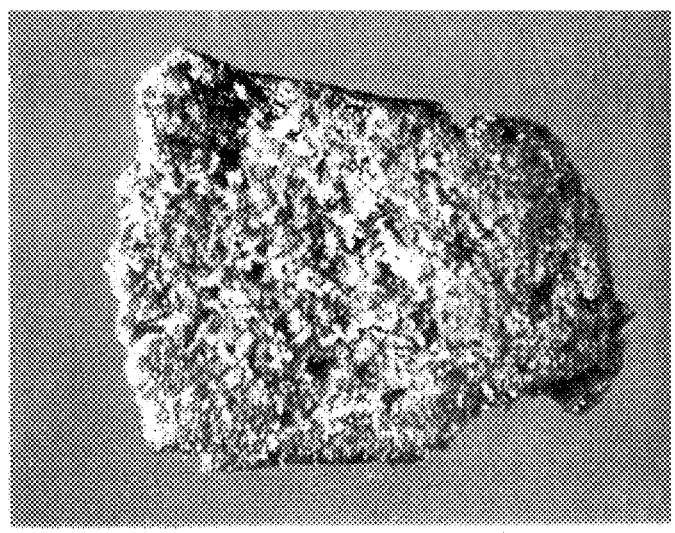
FIG. 3 shows the results of the addition of the suspensions of FIG. 1(A), (B) and (C) under vacuum to the fish meal pellets.
Figure 3B:
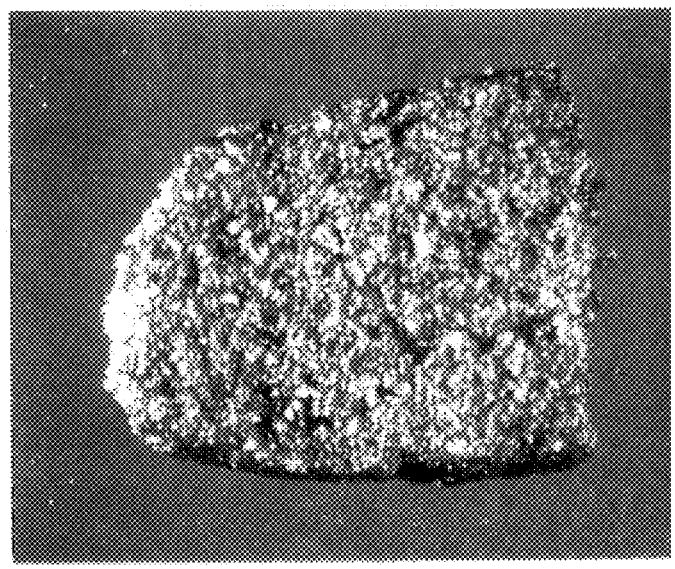
Figure 3C:
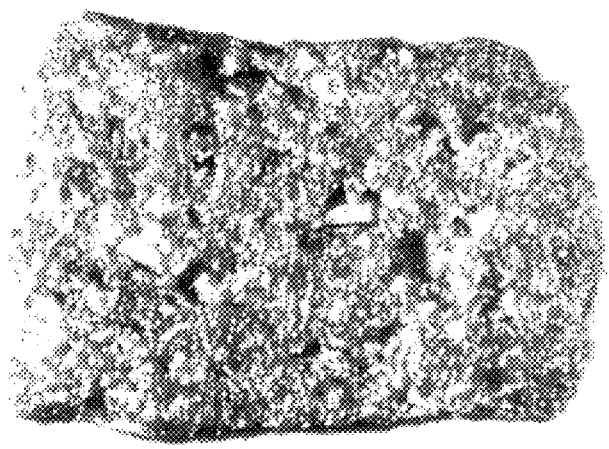

When pellets were prepared under vacuum Suspension I gave pellets with red colour in the interior and Phaffia mainly at their surface (FIG. 3A). With Suspension II the red colour was mainly in the interior of the pellet (FIG. 3B and C).

Reduction of particle size and application of the Suspension under vacuum clearly gives a better reproducible result.

B. Washing test

The release of astaxanthin from the particles was simulated by washing the pellets. The amount of astaxanthin was determined using HPLC.

Experiments were performed as follows.

a) 50 g fish meal pellet was brought in a 250 ml flask,
b) 100 ml water of 10° C. was added,
c) the flask was put in a Shake Water Bath at 10° C., 75 strokes per min. 4.5 cm amplitude for 5 min.
d) after shaking the particles were immediately sieved over a sieve with holes of 1 mm diameter,
e) the astaxanthin concentration was determined in untreated pellets, washing water and in the washed pellets, using HPLC.

The following amounts of astaxanthin were found.

A. Atmospheric pressure

TABLE I

| Suspension I | dry matter | asta mg/kg | asta mg/kg dry matter | asta loss |
|---|---|---|---|---|
| Pellets | 0.94 | 73.0 | 77.6 | |
| Washwater | | 1.3 | 1.5 | 1.9% |
| Washed pellets | 0.83 | 66.0 | 79.5 | |

TABLE II

| Suspension II | dry matter | asta mg/kg | asta mg/kg dry matter | asta loss |
|---|---|---|---|---|
| Pellets | 0.95 | 74.8 | 78.7 | |
| Washwater | | 0.28 | 0.4 | 0.5% |
| Washed pellets | 0.82 | 66.9 | 81.5 | |

TABLE III

| Suspension I | dry matter | asta mg/kg | asta mg/kg dry matter | asta loss |
|---|---|---|---|---|
| Pellets | 0.94 | 82.0 | 86.3 | |
| Washwater | | 1.5 | 1.6 | 1.8 |
| Washed pellets | 0.86 | 73.0 | 84.8 | |

TABLE IV

| Suspension II | dry matter | asta mg/kg | asta mg/kg dry matter | asta loss |
|---|---|---|---|---|
| Pellets | 0.95 | 82.4 | 86.7 | |
| Washwater | | 0.16 | 0.2 | 0.2% |
| Washed pellets | 0.75 | 64.2 | 85.6 | |

It is clear that the loss of astaxanthin is lower when particle diameter is smaller (Suspension II). And that the loss is further reduced considerably when pellets are prepared under vacuum.

The above examples merely serve to illustrate the principle underlying the invention and in no way are meant to determine the scope of the disclosure.

What is claimed is:

1. A method for preparing feed pellets loaded with an active ingredient said method comprising an extrusion step wherein said active ingredient is added after the extrusion process under reduced pressure.

2. The method of claim 1 wherein the active ingredient is a protein or a pigment.

3. The method of claim 2 wherein said protein is an enzyme and said pigment is a carotenoid.

4. A method for preparing pellets loaded with an active ingredient comprising the addition of a suspension or solution of feed or ingredients thereof in a fluid phases to the pellets under reduced pressure and subsequently increasing the pressure.

5. The method of claim 4 wherein the reduced pressure is a vacuum.

6. The method of claim 4 wherein the fluid phase is water or oil.

7. The method of claim 4 wherein the active ingredient is an enzyme or a pigment.

8. The method of claim 7 wherein the enzyme is phytase, lactase, protease or amylase.

9. The method of claim 7 wherein the pigment is a carotenoid.

10. The method of claim 9 wherein the carotenoid is astaxanthin, beta carotene, cantaxanthin or zeaxanthin.

11. A feed pellet containing more than 30 mg of active ingredient homogeneously distributed throughout the pellet.

12. The feed pellet of claim 11 which contains more than 81.5 mg active ingredient per kg dry matter.

* * * * *